United States Patent
Erlichman et al.

(10) Patent No.: US 10,507,923 B1
(45) Date of Patent: Dec. 17, 2019

(54) AUTOMATIC EJECTION DEVICE AND SYSTEM

(71) Applicant: Rockwell Collins, Inc., Cedar Rapids, IA (US)

(72) Inventors: Matthew J. Erlichman, St. Albans (GB); Samuel P. Evans, Aylesbury (GB)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/154,991

(22) Filed: Oct. 9, 2018

Related U.S. Application Data

(60) Provisional application No. 62/719,985, filed on Aug. 20, 2018.

(51) Int. Cl.
  *B64D 11/06* (2006.01)
  *E05F 1/16* (2006.01)
  *A47B 13/08* (2006.01)
  *A47B 88/463* (2017.01)
  *A47B 1/10* (2006.01)

(52) U.S. Cl.
  CPC ........ *B64D 11/0638* (2014.12); *A47B 13/081* (2013.01); *A47B 88/463* (2017.01); *E05F 1/16* (2013.01); *A47B 1/10* (2013.01); *E05Y 2201/47* (2013.01); *E05Y 2900/20* (2013.01)

(58) Field of Classification Search
  CPC .................................. A47B 13/081; E05F 1/16
  USPC .................. 108/43, 44, 69, 65, 37, 142, 143
  See application file for complete search history.

(56) References Cited

U.S. PATENT DOCUMENTS

| | | | | |
|---|---|---|---|---|
| 3,760,744 A | * | 9/1973 | Cruckshank | A47B 1/08 108/64 |
| 4,193,317 A | * | 3/1980 | Oono | G06K 1/121 108/137 |
| 4,193,650 A | * | 3/1980 | Gray | A47B 45/00 108/61 |
| 5,586,468 A | * | 12/1996 | Tomotaki | B23Q 5/408 108/143 |

(Continued)

OTHER PUBLICATIONS

Saint Louis Designs, Inc., www.saintlouisdesigns.com, Pusher, Mounted Drawing No. 20150MP-XX, Rev. A, Nov. 13, 2012, 1 page.

(Continued)

*Primary Examiner* — Jose V Chen
(74) *Attorney, Agent, or Firm* — Suiter Swantz pc llo

(57) ABSTRACT

A device may include a body, springs, and a plunger. The body may include a back wall and a front wall. The body may have a cavity forming spring channels and at least one rail. The front wall may have an aperture extending into the cavity. Each spring may be implemented in one of the spring channels. The plunger may include a plunger head and a plunger rod extending from the plunger head and through the aperture. The plunger head may be configured to engage the springs. The plunger head may have at least one rail guide channel, each configured to accommodate one rail. When a compressive force is applied to the plunger rod, the plunger head compresses the springs as the plunger head travels in a first direction within the cavity. When the compressive force is reduced, the plunger head travels in a second direction opposite the first direction.

19 Claims, 10 Drawing Sheets

(56) References Cited

U.S. PATENT DOCUMENTS

| | | | | |
|---|---|---|---|---|
| 5,655,743 | A * | 8/1997 | Gillis | G06F 3/0202 248/346.01 |
| 5,901,934 | A * | 5/1999 | Wilson | G06F 3/0395 248/346.01 |
| 6,003,446 | A * | 12/1999 | Leibowitz | A47B 23/002 108/43 |
| 6,234,085 | B1 * | 5/2001 | Ramundo | A47B 23/002 108/143 |
| 6,520,091 | B1 * | 2/2003 | Dettmers | A47B 5/006 108/42 |
| 7,007,614 | B2 * | 3/2006 | Gaunt | A47B 45/00 108/102 |
| 7,150,236 | B1 * | 12/2006 | Riley | A47B 23/04 108/43 |
| 7,645,001 | B2 * | 1/2010 | Harris | A47B 96/025 312/205 |
| 7,847,794 | B2 * | 12/2010 | Choi | B60R 11/0235 108/44 |
| 8,100,062 | B1 * | 1/2012 | Anghel | A47B 3/08 108/69 |
| 8,205,563 | B2 * | 6/2012 | St Louis | B64D 11/00 108/40 |
| 2009/0151120 | A1 * | 6/2009 | Lin | E05F 1/16 16/321 |
| 2009/0174234 | A1 * | 7/2009 | Vignal | B60N 3/002 297/163 |
| 2014/0137776 | A1 * | 5/2014 | Thomas | F16C 29/04 108/143 |
| 2015/0047150 | A1 * | 2/2015 | Saito | E05F 5/02 16/103 |
| 2016/0002966 | A1 * | 1/2016 | Zhong | E05F 3/02 16/66 |
| 2016/0076288 | A1 * | 3/2016 | Bantle | E05F 1/16 49/417 |
| 2016/0167555 | A1 * | 6/2016 | Allen | B64D 11/0638 108/40 |
| 2016/0273256 | A1 * | 9/2016 | Zimmer | E05F 5/027 |
| 2017/0130501 | A1 * | 5/2017 | Svara | E05F 5/003 |
| 2019/0069672 | A1 * | 3/2019 | Pan | A47B 88/467 |

OTHER PUBLICATIONS

Saint Louis Designs, Inc., Spring Block, Available Nov. 13, 2012, 1 page.

\* cited by examiner

AUTOMATIC EJECTION DEVICE AND SYSTEM

CROSS-REFERENCE TO RELATED APPLICATIONS

The present application claims the benefit under 35 U.S.C. § 119(e) of U.S. Provisional Application Ser. No. 62/719,985, filed Aug. 20, 2018. U.S. Provisional Application Ser. No. 62/719,985 is herein incorporated by reference in its entirety.

BACKGROUND

Existing sliding table spring blocks are subject to unwanted impact on the spring blocks, which is causing failure of the spring blocks when the spring blocks are subjected to abusive loads.

SUMMARY

In one aspect, embodiments of the inventive concepts disclosed herein are directed to a system including a device. The device may include a body, springs, and a plunger. The body may include a back wall and a front wall. The body may have a cavity at least forming spring channels and at least one rail. The spring channels and the at least one rail may extend in a longitudinal direction between the back wall and the front wall of the body. Each of the at least one rail may be implemented between two of the spring channels. The front wall of the body may have an aperture extending into the cavity. Each of the springs may be implemented in one of the spring channels and may be configured to compress and decompress within one of the spring channels. The plunger may include a plunger head and a plunger rod extending from the plunger head and through the aperture. The plunger head may be implemented within the cavity and configured to engage the springs. The plunger head may have at least one rail guide channel. Each of the at least one rail guide channel may be configured to accommodate one of the at least one rail. When a compressive force is applied to an end of the plunger rod, the plunger head compresses the springs as the plunger head travels in a first direction within the cavity along the at least one rail. When the compressive force is reduced or removed, the plunger head travels in a second direction opposite the first direction within the cavity along the at least one rail.

In a further aspect, embodiments of the inventive concepts disclosed herein are directed to an aircraft system including a device, a first structural member, and a second structural member. The device may include a body, springs, and a plunger. The body may include a back wall and a front wall. The body may have a cavity at least forming spring channels and at least one rail. The spring channels and the at least one rail may extend in a longitudinal direction between the back wall and the front wall of the body. Each of the at least one rail may be implemented between two of the spring channels. The front wall of the body may have an aperture extending into the cavity. Each of the springs may be implemented in one of the spring channels and may be configured to compress and decompress within one of the spring channels. The plunger may include a plunger head and a plunger rod extending from the plunger head and through the aperture. The plunger head may be implemented within the cavity and configured to engage the springs. The plunger head may have at least one rail guide channel. Each of the at least one rail guide channel may be configured to accommodate one of the at least one rail. When a compressive force is applied to an end of the plunger rod, the plunger head compresses the springs as the plunger head travels in a first direction within the cavity along the at least one rail. When the compressive force is reduced or removed, the plunger head travels in a second direction opposite the first direction within the cavity along the at least one rail. The first structural member may have a first surface, wherein the device is attached to the first surface. The second structural member may be movably positioned in relation to the first structural member such that a portion of the second structural member is configured to apply the compressive force to the end of the plunger rod of the device when the portion of the second structural member abuts the end of the plunger rod. The device, the first structural member, and the second structural member may be implemented in an aircraft.

In a further aspect, embodiments of the inventive concepts disclosed herein are directed to a system including a device, a first structural member, an ejectable table, and a latch. The device may include a body, springs, and a plunger. The body may include a back wall and a front wall. The body may have a cavity at least forming spring channels and at least one rail. The spring channels and the at least one rail may extend in a longitudinal direction between the back wall and the front wall of the body. Each of the at least one rail may be implemented between two of the spring channels. The front wall of the body may have an aperture extending into the cavity. Each of the springs may be implemented in one of the spring channels and may be configured to compress and decompress within one of the spring channels. The plunger may include a plunger head and a plunger rod extending from the plunger head and through the aperture. The plunger head may be implemented within the cavity and configured to engage the springs. The plunger head may have at least one rail guide channel. Each of the at least one rail guide channel may be configured to accommodate one of the at least one rail. When a compressive force is applied to an end of the plunger rod, the plunger head compresses the springs as the plunger head travels in a first direction within the cavity along the at least one rail. When the compressive force is reduced or removed, the plunger head travels in a second direction opposite the first direction within the cavity along the at least one rail. The first structural member may have a first surface, wherein the device is attached to the first surface. The ejectable table may be movably positioned in relation to the first structural member such that a portion of the ejectable table is configured to apply the compressive force to the end of the plunger rod of the device when the portion of the ejectable table abuts the end of the plunger rod. The latch may be configured to releasably lock the ejectable table in a position where the ejectable table is configured to apply the compressive force to the end of the plunger rod of the device. When the latch is released, the springs of the device may be configured to decompress so as to move the ejectable table in a direction away from the back wall of the device.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
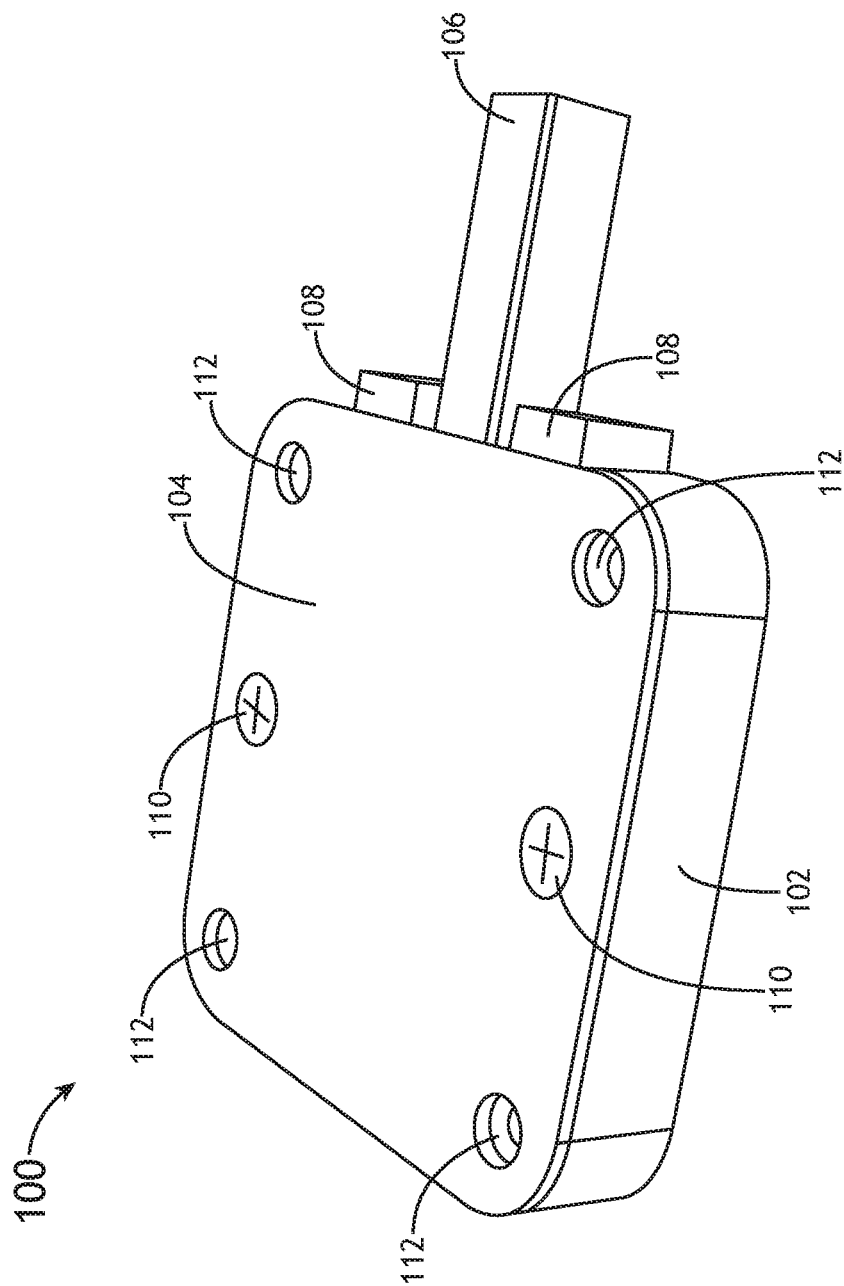
FIG. 1 is a top perspective view of an exemplary embodiment of an automatic ejection device (AED) according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an automatic ejection device (AED) and a system.

Embodiments may include an AED, such as a spring block (e.g., a sliding table spring block). The AED may include a body that retains one or more (e.g., three) springs that may be operated in compression by a plunger that may include a shaped end, which may provide simultaneous actuation and uniform contact with all of the springs.

In some embodiments, the body may have a single-sided cavity without a symmetrical split line.

In some embodiments, to prevent over compression of the springs imposing excessive mechanical loads on a back wall of the body, stops may be incorporated into the spring retention portion that limits the travel of the plunger.

In some embodiments, guide channels in the plunger and rails in the AED body may prevent misalignment and interference between the springs and may ensure accurate linear travel of the plunger.

In some embodiments, to prevent damage to the spring block body, either side of the plunger projection aperture may have reinforcing pads, which may serve to protect the exposed plunger pin from over-compression and potential failure.

In some embodiments, the external reinforcing pads may also serve to reduce noise by providing a metal to plastic (or other non-metallic material) contact when stowing a table, as opposed to a metal to metal contact.

In some embodiments, to provide serviceability of the springs and plunger in the event of a failure and to simplify manufacture, the AED may include a removable lid that may encapsulate internal components of the AED.

In some embodiments, the lid may be retained by threaded fixings positioned in such a way as to allow the block body to be easily attached to a mounting surface at the block's extremities, which may evenly distribute operational loads in the block and the mounting surface.

In some embodiments, the block may be manufactured from metallic materials, non-metallic materials (e.g., plastic, silicone, nylon, or a combination thereof), or a combination thereof.

Some embodiments may include a compact AED having a robust body for resisting internal spring compression forces.

In some embodiments, the body has a cavity formed on one side with a thin section cover forming an enclosure.

In some embodiments, a plunger may include a plunger rod (e.g., a plunger pin) and a plunger head (e.g., a wide base) that may allow uniform compression of a plurality of springs.

In some embodiments, internal stops within the cavity may prevent the compression of springs beyond the springs' maximum solid length that prevents damage to the springs, the plunger, or the AED body.

In some embodiments, external stops on either or both sides of the extended pin of the plunger may prevent damage during operational use to both the springs and the pin due to over-compression.

In some embodiments, noise may be reduced when stowing a sliding table of a sliding table assembly having such an AED through use of plastic or other resilient non-metallic external stops.

In some embodiments, a mechanically attached removable lid or cover may allow for simple manufacture, assembly, disassembly, servicing and replacing of internal components of the AED.

In some embodiments, the AED may be mounted using a plurality of fixings around the AED's periphery in order to equally distribute loads imposed during normal operation through both the AED's body and the surface that the AED is being attached to.

In some embodiments, the AED may be manufactured from mostly metallic parts. In some embodiments, the AED may be manufactured from mostly injection molded non-metallic parts. In some embodiments, the AED may be manufactured from a combination of metallic and non-metallic parts.

Embodiments may be installed in a vehicle (e.g., an aircraft), such as on aircraft sliding tables (e.g., A350 sliding tables).

Figure 2:
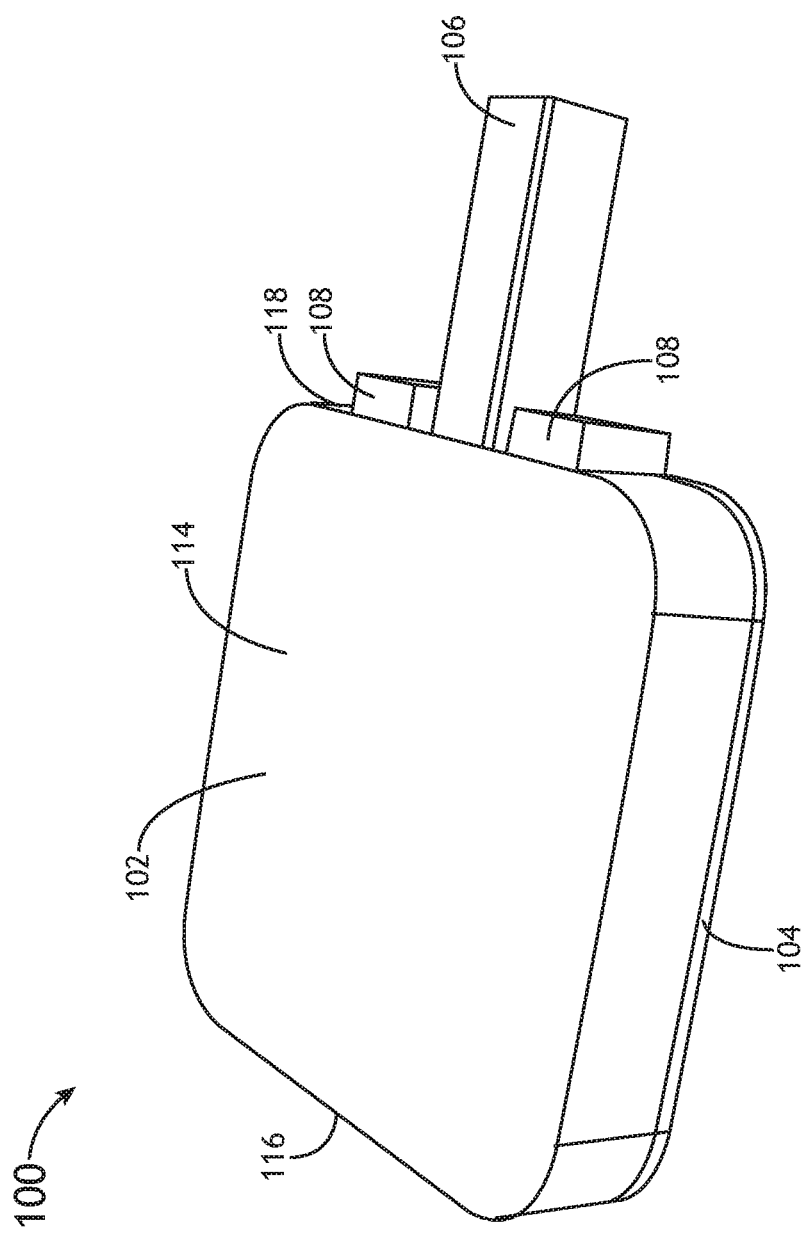
FIG. 2 is a bottom perspective view of the AED of FIG. 1 according to the inventive concepts disclosed herein.
Figure 3:
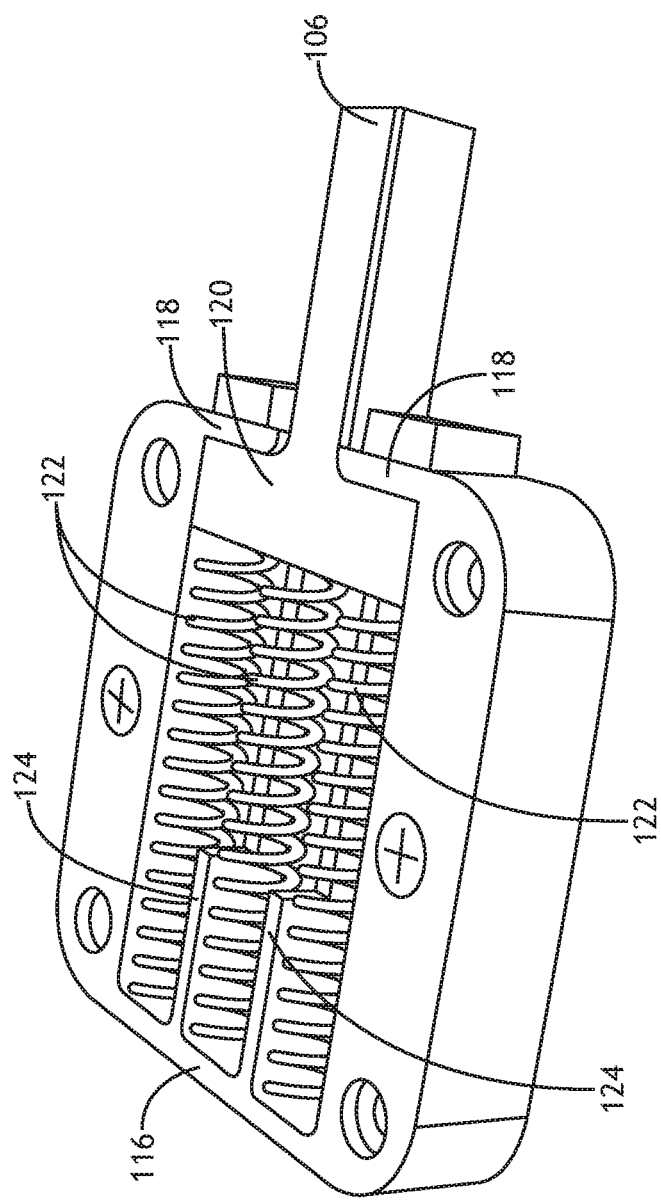
FIG. 3 is a top perspective view of the AED of FIG. 1 with a removable lid removed according to the inventive concepts disclosed herein.
Figure 4:
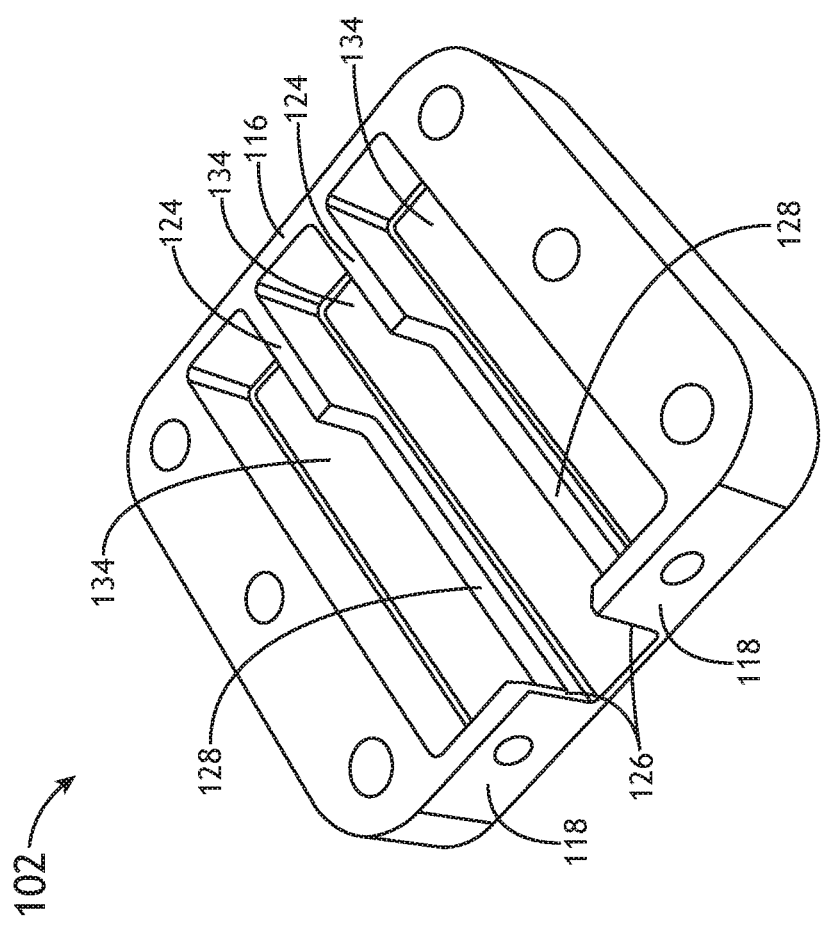
FIG. 4 is a top perspective view of a body of the AED of FIG. 1 with a removable lid removed according to the inventive concepts disclosed herein.

Referring now to FIGS. 1-4, an exemplary embodiment of a device (e.g., an AED 100) according to the inventive concepts disclosed herein is depicted. FIG. 1 shows a top perspective view of the AED 100. FIG. 2 shows a bottom perspective view of the AED 100. FIG. 3 shows a top perspective view of the AED 100 with a removable lid 104 removed. FIG. 4 shows a top perspective view of a body 102 of the AED 100 with a removable lid 104 removed.

As shown in FIGS. 1-4, the AED 100 may include a body 102, a removable lid 104, a plunger (e.g., 500A, 500B, or 500C), lid attachment means 110, device attachment means 112, external stops 108, and a plurality (e.g., two, three, four, five, or more) of springs 122.

The body 102 may be generally cuboid shaped (e.g., generally rectangular cuboid-shaped with rounded corners and/or rounded vertices). The body 102 may have at least one cavity and may include a plurality of walls, such as a front wall 118, a back wall 116, a bottom wall 114 extending from the front wall 118 to the back wall 116, and two side walls (not labeled). A top portion (not labeled) of the body 102 may abut the removable lid 104 when installed. The body 102 may include holes 112 configured to receive attachment means (e.g., screws or bolts) for attaching the AED 100 to a mounting surface (e.g., structural member 604). The body 102 may be formed of a single piece of material or may have multiple mechanically attached, fused, or bonded components. The body 102 may be formed by any suitable material or combination of materials, such as metallic materials, non-metallic materials, or a combination thereof.

The cavity of the body 102 may form a plurality (e.g., two, three, four, five, or more) of spring channels 124, at least one rail 128, and at least one internal stop 124, as well as other features of the body 102.

Each of the spring channels 124 may be configured to accommodate a spring 122 and a portion of the plunger head 120 of the plunger (e.g., 500A, 500B, or 500C). The spring channels 124 may be parallel and may extend in a longitudinal direction between the back wall 116 and the front wall 118 of the body 102.

The at least one rail 128 may extend in a longitudinal direction between the back wall 116 and the front wall 118 of the body 102. Each of the at least one rail 128 may be implemented between two of the spring channels 124 and parallel to the spring channels 124. Each rail guide channel 130 of the plunger (e.g., 500A, 500B, or 500C) may slide along one of the at least one rail 128 as the plunger head 120 travels in a first direction or an opposite direction within the cavity along one of the at least one rail 128.

Each of the at least one internal stop 124 may be positioned between the back wall 116 and the front wall 118 of the body 102. The at least one internal stop 124 may be configured to limit an amount of travel of the plunger head 120 toward the back wall of the body and to prohibit full compression and over-compression of the plurality of springs 122. Each of the at least one internal stop 124 may be positioned along or at an end of one of the at least one rail 128.

The front wall 118 of the body 102 may include an aperture 126 extending into the cavity. The aperture 126 may allow a plunger rod 106 of the plunger (e.g., 500A, 500B, or 500C) to slide through the aperture 126 into the cavity of the body 102. The aperture 126 may have any suitable shape (e.g., round, triangular, rectangular, pentagonal, or hexagonal) to accommodate the plunger rod 106 to slide through the aperture. For example, the aperture 126 may be rectangular (e.g., square) with three sides of the aperture formed by the body 102 and one side of the aperture formed by the removable lid 104.

The removable lid 104 may be removably installed on top of the body 102 via lid attachment means 110 (e.g., screws or bolts inserted through holes in the removable lid 104 and the body 102) and may form a removable top wall of the AED 100. Once installed, the removable lid 104 may be removed to service or replace internal components of the AED 100. The removable lid 104 may be formed by any suitable material or combination of materials, such as metallic materials, non-metallic materials, or a combination thereof.

Each of the springs 122 may be implemented in one of the spring channels 134. Each of the springs 122 may be configured to compress or decompress within one of the spring channels 134 based on an amount of force applied by the plunger head 120 of the plunger (e.g., 500A, 500B, or 500C) on a given spring 122.

The plunger (e.g., 500A, 500B, or 500C) may be generally T-shaped and may include a plunger head 120 and a plunger rod 106. The plunger rod 106 may extend from the plunger head 120 and through the aperture 126 out of the body 102. The plunger head 120 may be implemented within the cavity of the body 102 and configured to engage the plurality of springs 122. The plunger head may have at least one rail guide channel 130, wherein each of the at least one rail guide channel 130 may be configured to accommodate one of the at least one rail 128. The plunger head 120 may be shaped with at least one flat surface (e.g., 132) configured to abut and to uniformly compress the springs 122 when a compressive force is applied to the end of the plunger rod 106.

The external stops 108 may be positioned on an exterior of the front wall 118 of the body 102 and may extend outwardly away from the exterior of the front wall 118 of the body 102. The external stops 108 may be configured to limit an amount of travel of the plunger head 120 toward the back wall 116 of the body 102. The external stops 108 may be formed by any suitable material or combination of materials, such as metallic materials, non-metallic materials, or a combination thereof. For example, the external stops 108 may be formed of plastic or silicone to reduce noise of a structural member (e.g., a sliding table 606) depressing the plunger rod 106 and bumping into the external stops 108.

When a compressive force is applied to a protruding end of the plunger rod 106, the plunger head 120 compresses the plurality of springs 122 as the plunger head 120 travels in a first direction within the cavity along the at least one rail 128. When the compressive force is reduced or removed, the plunger head 120 travels in a second direction opposite the first direction within the cavity along the at least one rail 128.

Figure 5A:
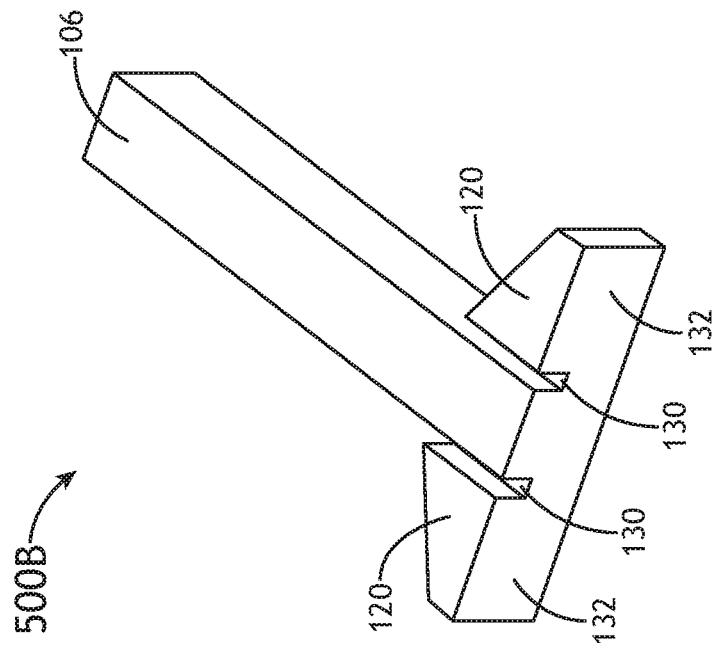
FIG. 5A is a bottom perspective view of an exemplary embodiment of a plunger of an AED according to the inventive concepts disclosed herein.
Figure 5B:
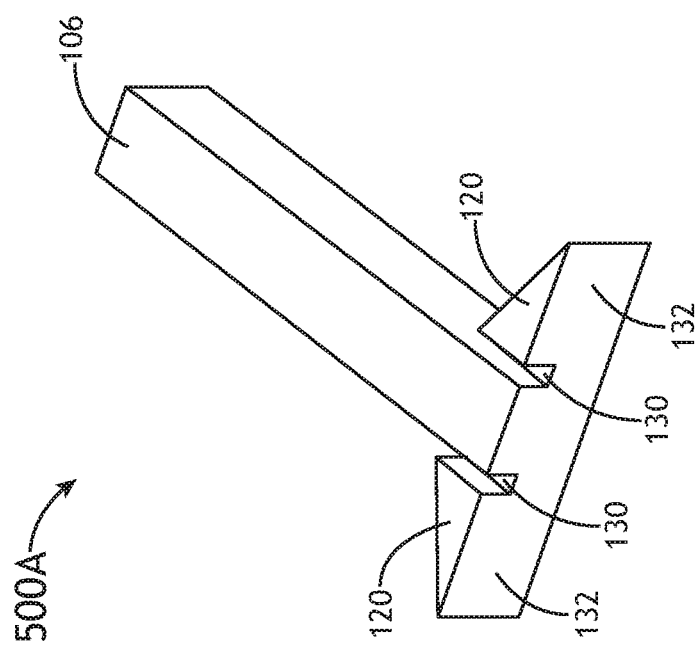
FIG. 5B is a bottom perspective view of an exemplary embodiment of a plunger of an AED according to the inventive concepts disclosed herein.
Figure 5C:
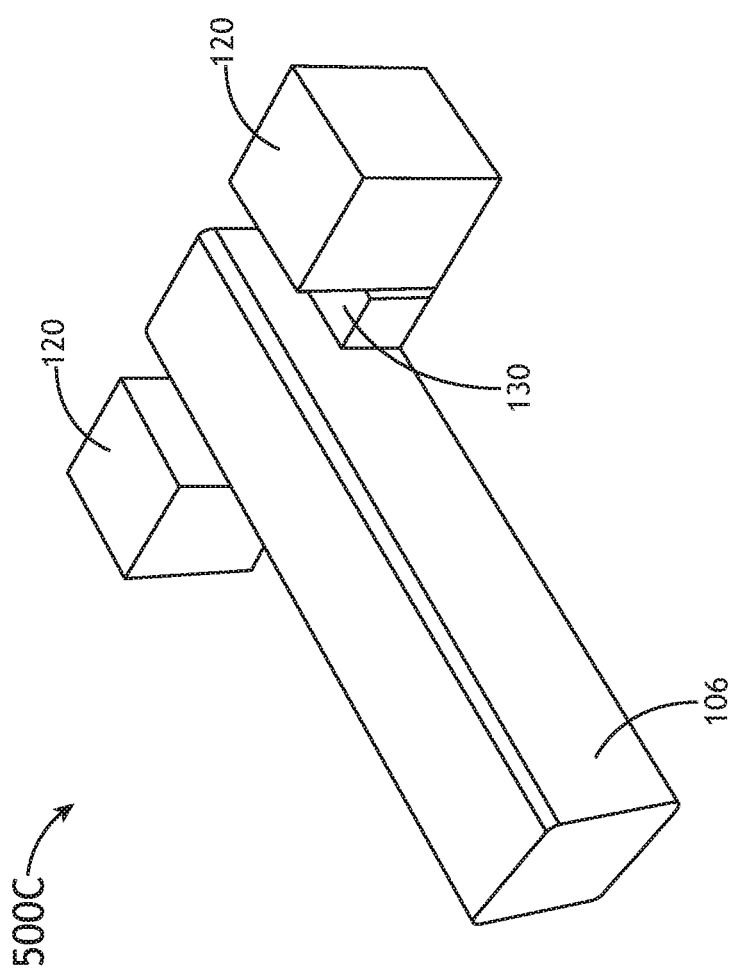
FIG. 5C is a bottom perspective view of an exemplary embodiment of a plunger of an AED according to the inventive concepts disclosed herein.

Referring now to FIGS. 5A, 5B, and 5C, exemplary embodiments of a plunger (e.g., 500A, 500B, 500C) of the AED 100 according to the inventive concepts disclosed herein are depicted. FIG. 5A shows a bottom perspective view of a plunger 500A having a double-wedge-shaped plunger head 120 that tapers as the plunger head 120 extends away from the plunger rod 106. FIG. 5B shows a bottom perspective view of a plunger 500B having a double-trapezoid-shaped plunger head 120 that tapers as the plunger head 120 extends away from the plunger rod 106. FIG. 5C shows a bottom perspective view of a plunger 500C having a double-bar-shaped plunger head 120 that does not taper as the plunger head 120 extends away from the plunger rod 106.

As shown in FIGS. 5A-5C, the plunger head 120 may have at least one (e.g., two or more) rail guide channel 130. Each rail guide channel 130 may be configured to accommodate one of the at least one rail 128.

Referring now to FIGS. 6-9, an exemplary embodiment of a system (e.g., a vehicular system, such as an aircraft system 600A) including a vehicle (e.g., an aircraft 600) including a multi-structural member assembly (e.g., a sliding table assembly 602) that includes the AED 100 according to the inventive concepts disclosed herein is depicted.

The multi-structural member assembly (e.g., the sliding table assembly 602) may include a first structural member (e.g., a stationary structural member 604) and a second structural member (e.g., an ejectable table 606). The first structural member may have a first surface, wherein the AED 100 is attached to the first surface. The second structural member may be movably positioned in relation to the first structural member such that a portion of the second structural member is configured to apply a compressive force to the end of the plunger rod 106 of the AED 100 when the portion of the second structural member abuts the end of the plunger rod 106.

The multi-structural member assembly (e.g., the sliding table assembly 602) may further include at least one latch (e.g., latches 610) configured to releasably lock the second structural member (e.g., an ejectable table 606) in a position where the second structural member (e.g., an ejectable table 606) is configured to apply the compressive force to the end of the plunger rod 106 of the AED 100. When the at least one latch is released, the plurality of springs 122 of the AED 100 are configured to decompress so as to move (e.g., eject) the second structural member (e.g., an ejectable table 606) in a direction away from the back wall 116 of the AED 100.

Figure 6:
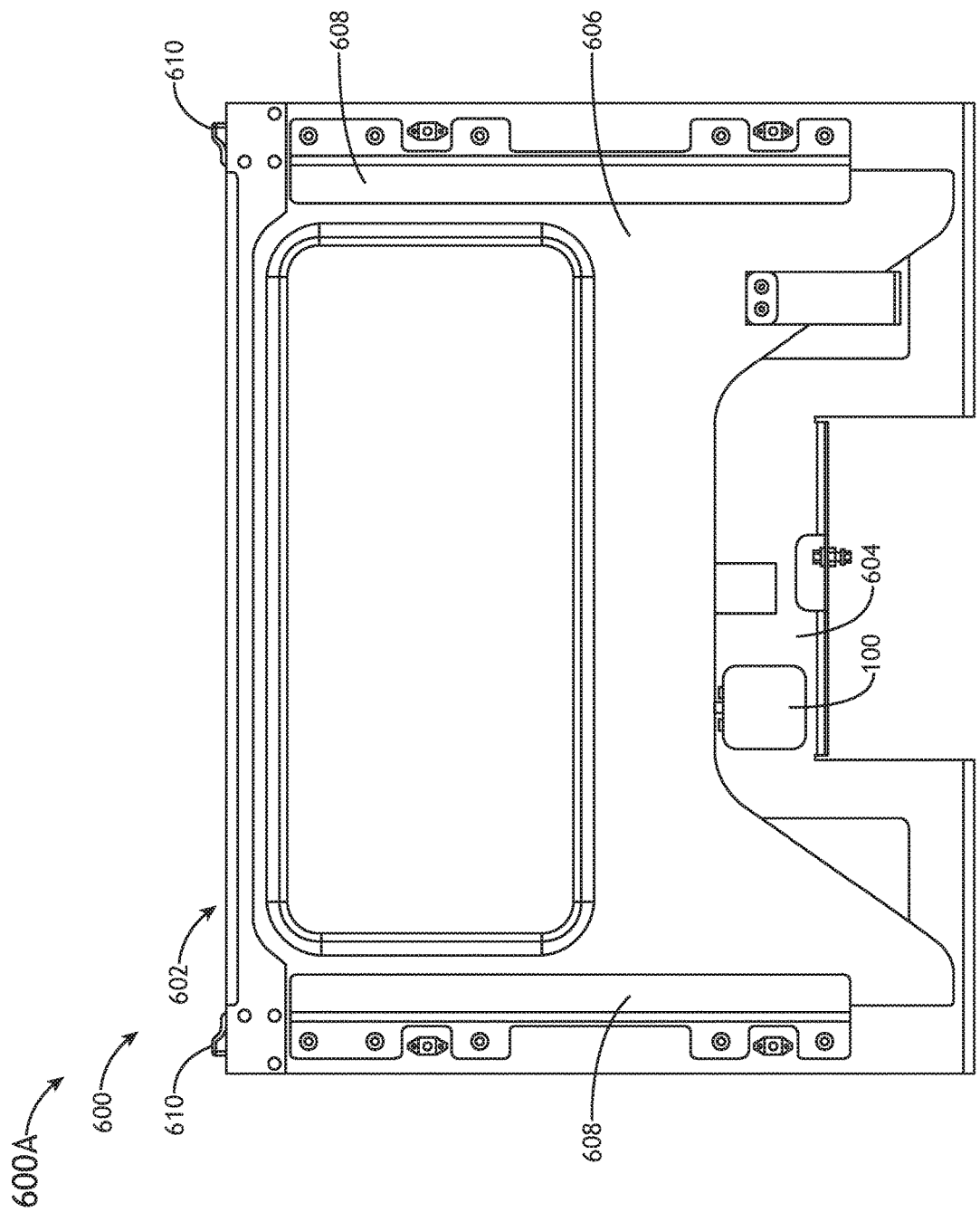
FIG. 6 is a top plan view of an exemplary embodiment of a system including a sliding table assembly including the AED of FIG. 1 according to the inventive concepts disclosed herein.
Figure 7:
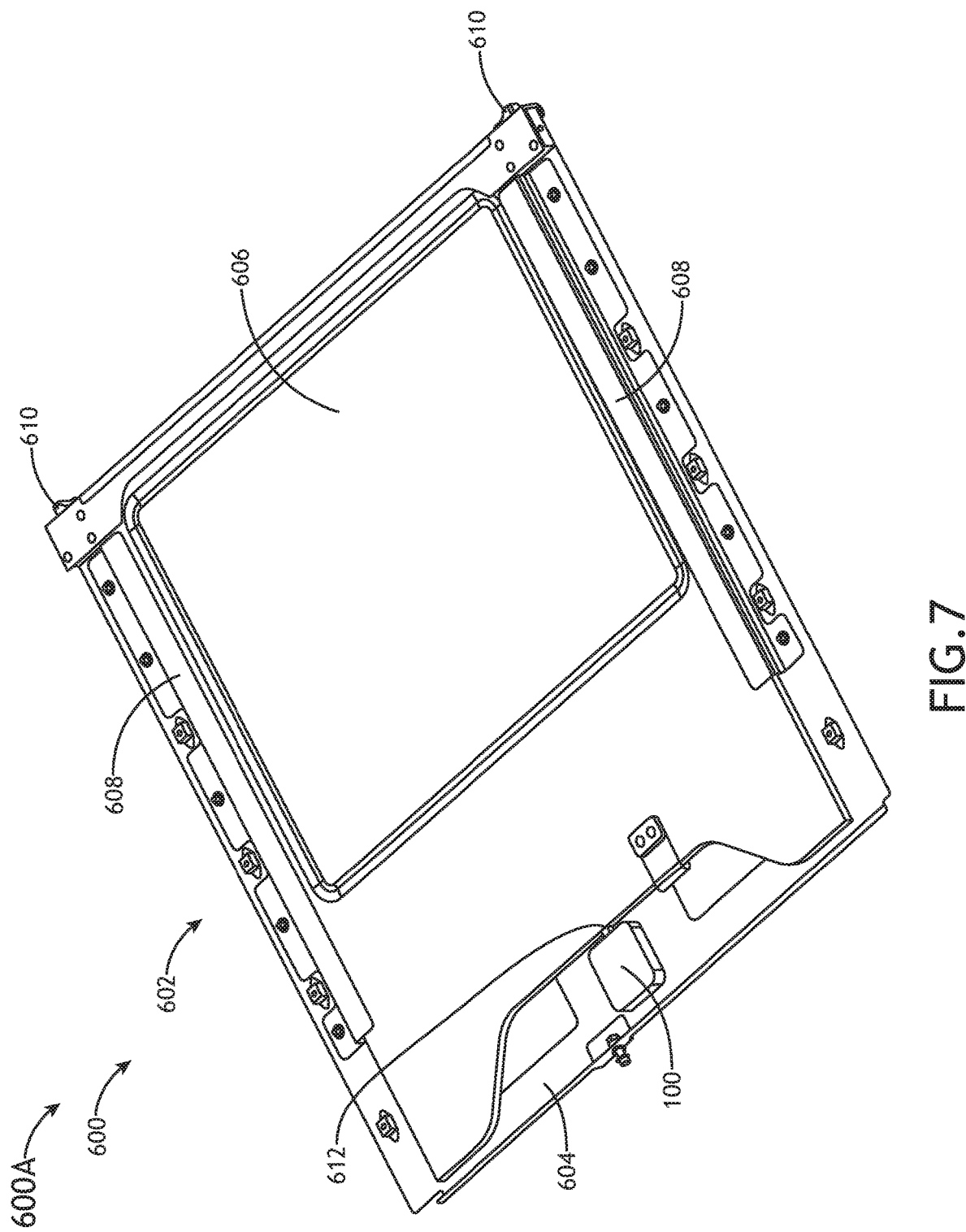
FIG. 7 is a top perspective view of the system of FIG. 6 with an ejectable table in a stowed position according to the inventive concepts disclosed herein.
Figure 8:
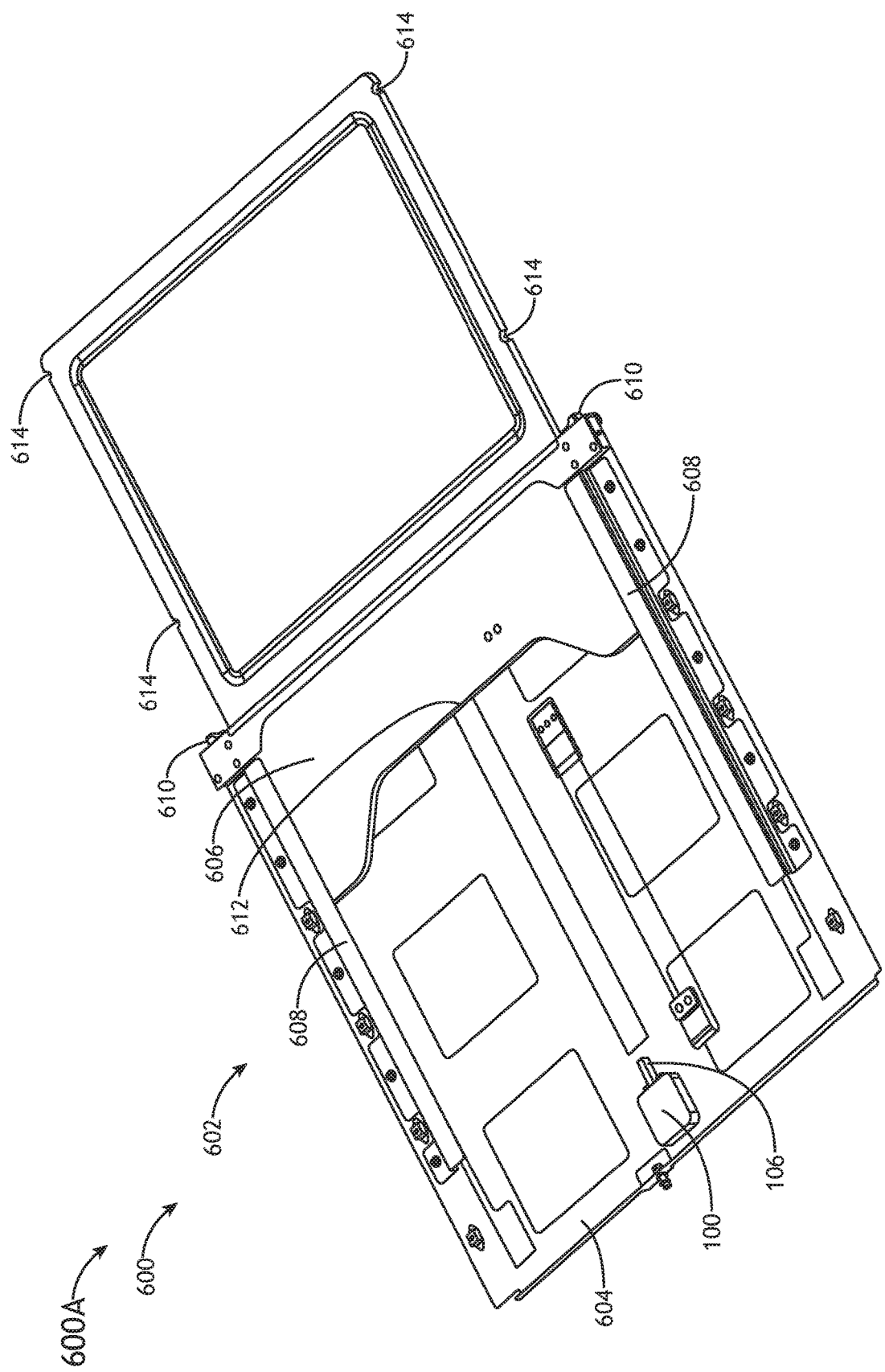
FIG. 8 is a top perspective view of the system of FIG. 6 with the ejectable table in an ejected position according to the inventive concepts disclosed herein.
Figure 9:
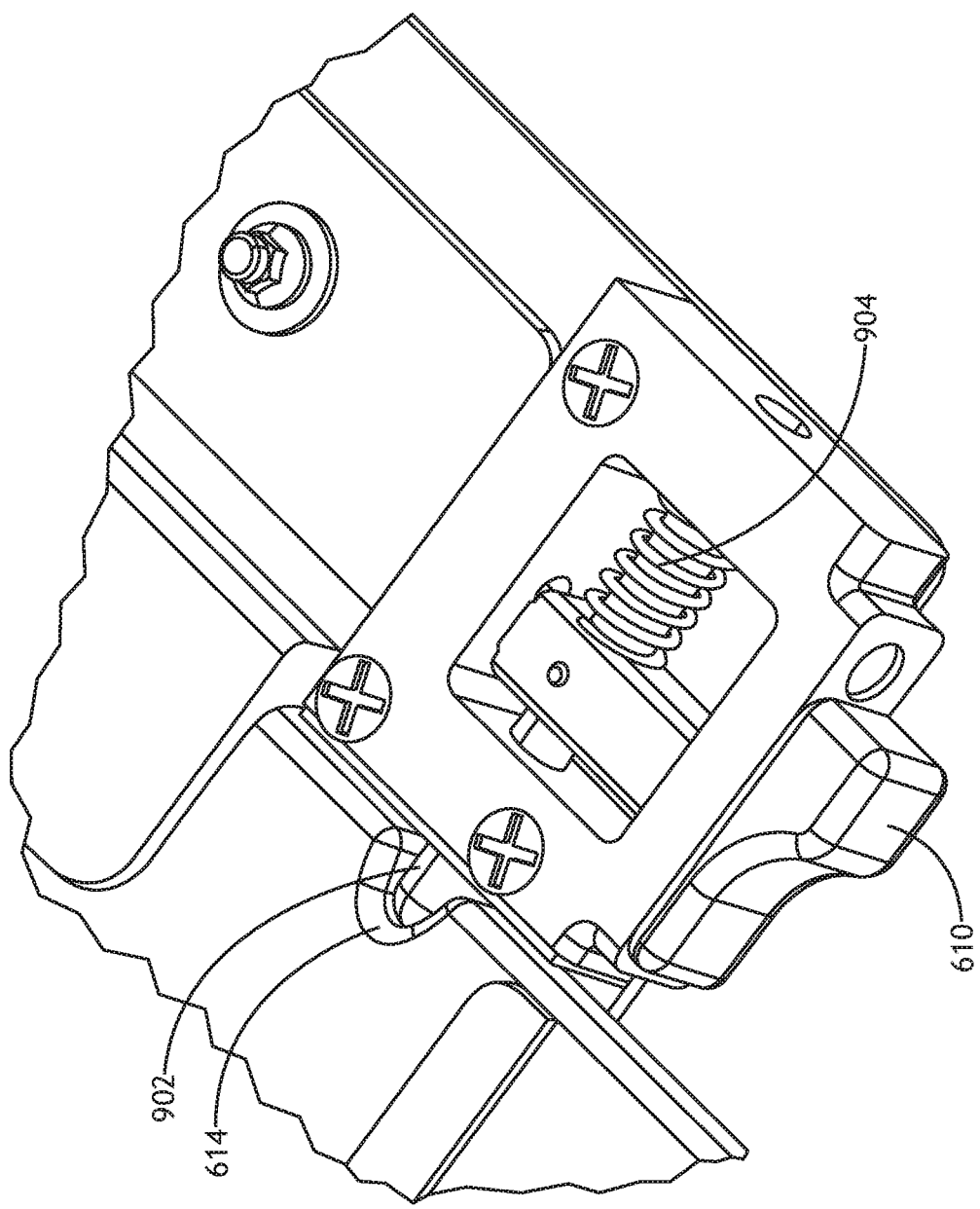
FIG. 9 is a top perspective view of a portion of the system of FIG. 6 with the ejectable table in an ejected position and locked in place by a latch assembly according to the inventive concepts disclosed herein.

Referring still to FIG. 6-9, the sliding table assembly 602 may include the AED 100, a stationary structural member 604, an ejectable table 606, tracks 608, and latches 610. FIG. 6 shows a top plan view of the sliding table assembly 602 with the ejectable table 606 in a stowed position. FIG. 7 shows a top perspective view of the sliding table assembly 602 with the ejectable table 606 in a stowed position. FIG. 8 shows a top perspective view of the sliding table assembly 602 with the ejectable table 606 in an ejected position. FIG. 9 shows a top perspective view of a portion of the sliding table assembly 602 with the ejectable table 606 in an ejected position and locked in place by a latch assembly.

The stationary structural member 604 may be implemented as a frame or panel that may be attached to a portion of the vehicle (e.g., the aircraft 600). The AED 100 may be attached to a surface of the stationary structural member 604. The tracks 608 may be attached to the stationary structural member 604. The tracks 608 may be configured to accommodate the ejectable table 606.

The ejectable table 606 may be configured to slide along the tracks 608 between a stowed position and one or more ejected positions. Along sides of the ejectable table 606, the ejectable table 606 may include one or more notches 614 which may be configured to accommodate one or more pins 902 of one or more latch assemblies for locking the ejectable table 606 in position relative to the stationary structural member 604, such as in a stowed position or a particular ejected position. A portion 612 of the ejectable table 606 may be configured to apply compressive force to the end of the plunger rod 106 of the AED 100 when the portion 612 of the ejectable table 606 abuts the end of the plunger rod 106.

Referring to FIG. 9, each of one or more latch assemblies may include a latch 610, a spring 904, and a pin 902. Each latch 610 may be configured to releasably lock the ejectable table 606 in a position where the ejectable table 606 is configured to apply the compressive force to the end of the plunger rod 106 of the AED 100. When the latch 610 is released, the plurality of springs 122 of the AED 100 may be configured to decompress so as to move (e.g., eject) the ejectable table 606 in a direction away from the back wall 116 of the AED 100.

As will be appreciated from the above, embodiments of the inventive concepts disclosed herein may be directed to a system including an AED.

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   a device, comprising:
   a body including a back wall and a front wall, the body having a cavity at least forming a plurality of spring channels and at least one rail, the plurality of spring channels and the at least one rail extending in a longitudinal direction between the back wall and the front wall of the body, each of the at least one rail implemented between two of the plurality of spring channels, the front wall of the body having an aperture extending into the cavity;
   a plurality of springs, each of the plurality of springs implemented in one of the plurality of spring channels, each of the plurality of springs configured to compress and decompress within one of the plurality of spring channels; and
   a plunger comprising a plunger head and a plunger rod extending from the plunger head and through the aperture, the plunger head implemented within the cavity and configured to engage the plurality of springs, the plunger head having at least one rail guide channel, each of the at least one rail guide channel configured to accommodate one of the at least one rail,
   wherein, when a compressive force is applied to an end of the plunger rod, the plunger head compresses the plurality of springs as the plunger head travels in a first direction within the cavity along the at least one rail,
   wherein, when the compressive force is reduced or removed, the plunger head travels in a second direction opposite the first direction within the cavity along the at least one rail.

2. The system of claim 1, wherein the plurality of spring channels comprises at least three spring channels, the at least one rail comprises at least two rails, the at least one rail guide channel comprises at least two rail guide channels, and the plurality of springs comprises at least three springs.

3. The system of claim 2, wherein the plurality of spring channels is three spring channels, the at least one rail is two rails, the at least one rail guide is two rail guide channels, and the plurality of springs is three springs.

4. The system of claim 1, wherein the plunger head includes at least one flat surface configured to abut and to uniformly compress the plurality of springs when the compressive force is applied to the end of the plunger rod.

5. The system of claim 1, wherein the cavity further forms at least one internal stop positioned between the back wall and the front wall of the body, the at least one internal stop configured to limit an amount of travel of the plunger head toward the back wall of the body and to prohibit full compression and over-compression of the plurality of springs.

6. The system of claim 5, wherein each of the at least one internal stop is positioned along or at an end of one of the at least one rail.

7. The system of claim 1, further comprising at least one external stop positioned on an exterior of the front wall of the body, the at least one external stop configured to limit an amount of travel of the plunger head toward the back wall of the body.

8. The system of claim 7, wherein the at least one external stop is two external stops.

9. The system of claim 7, wherein the at least one external stop is composed of at least one non-metallic material.

10. The system of claim 1, wherein the body further includes a bottom wall, the bottom wall extending from the front wall to the back wall.

11. The system of claim 10, wherein the device further comprises a removable lid forming a removable top wall of the device.

12. The system of claim 1, wherein a composition of the device includes at least one metallic material.

13. The system of claim 1, wherein a composition of the device includes at least one non-metallic material.

14. The system of claim 1, further comprising:
   a first structural member having a first surface, wherein the device is attached to the first surface; and
   a second structural member movably positioned in relation to the first structural member such that a portion of the second structural member is configured to apply the compressive force to the end of the plunger rod of the device when the portion of the second structural member abuts the end of the plunger rod.

15. The system of claim 14, wherein the first structural member, the second structural member, and the device are implemented as part of a sliding table assembly, wherein the second structural member is an ejectable table.

16. The system of claim 14, further comprising:
   at least one latch configured to releasably lock the second structural member in a position where the second structural member is configured to apply the compressive force to the end of the plunger rod of the device,
   wherein, when the latch is released, the plurality of springs of the device are configured to decompress so as to move the second structural member in a direction away from the back wall of the device.

17. The system of claim 1, wherein the system is a vehicular system, wherein the device is implemented in a vehicle.

18. An aircraft system, comprising:
a device, comprising:
- a body including a back wall and a front wall, the body having a cavity at least forming a plurality of spring channels and at least one rail, the plurality of spring channels and the at least one rail extending in a longitudinal direction between the back wall and the front wall of the body, each of the at least one rail implemented between two of the plurality of spring channels, the front wall of the body having an aperture extending into the cavity;
- a plurality of springs, each of the plurality of springs implemented in one of the plurality of spring channels, each of the plurality of springs configured to compress and decompress within one of the plurality of spring channels; and
- a plunger comprising a plunger head and a plunger rod extending from the plunger head and through the aperture, the plunger head implemented within the cavity and configured to engage the plurality of springs, the plunger head having at least one rail guide channel, each of the at least one rail guide channel configured to accommodate one of the at least one rail,
- wherein, when a compressive force is applied to an end of the plunger rod, the plunger head compresses the plurality of springs as the plunger head travels in a first direction within the cavity along the at least one rail,
- wherein, when the compressive force is reduced or removed, the plunger head travels in a second direction opposite the first direction within the cavity along the at least one rail;
a first structural member having a first surface, wherein the device is attached to the first surface; and
a second structural member movably positioned in relation to the first structural member such that a portion of the second structural member is configured to apply the compressive force to the end of the plunger rod of the device when the portion of the second structural member abuts the end of the plunger rod,
wherein the device, the first structural member, and the second structural member are implemented in an aircraft.

19. A system, comprising:
a device, comprising:
- a body including a back wall and a front wall, the body having a cavity at least forming a plurality of spring channels and at least one rail, the plurality of spring channels and the at least one rail extending in a longitudinal direction between the back wall and the front wall of the body, each of the at least one rail implemented between two of the plurality of spring channels, the front wall of the body having an aperture extending into the cavity;
- a plurality of springs, each of the plurality of springs implemented in one of the plurality of spring channels, each of the plurality of springs configured to compress and decompress within one of the plurality of spring channels; and
- a plunger comprising a plunger head and a plunger rod extending from the plunger head and through the aperture, the plunger head implemented within the cavity and configured to engage the plurality of springs, the plunger head having at least one rail guide channel, each of the at least one rail guide channel configured to accommodate one of the at least one rail,
- wherein, when a compressive force is applied to an end of the plunger rod, the plunger head compresses the plurality of springs as the plunger head travels in a first direction within the cavity along the at least one rail,
- wherein, when the compressive force is reduced or removed, the plunger head travels in a second direction opposite the first direction within the cavity along the at least one rail;
a first structural member having a first surface, wherein the device is attached to the first surface;
an ejectable table movably positioned in relation to the first structural member such that a portion of the ejectable table is configured to apply the compressive force to the end of the plunger rod of the device when the portion of the ejectable table abuts the end of the plunger rod; and
at least one latch configured to releasably lock the ejectable table in a position where the ejectable table is configured to apply the compressive force to the end of the plunger rod of the device,
wherein, when the latch is released, the plurality of springs of the device are configured to decompress so as to move the ejectable table in a direction away from the back wall of the device.

* * * * *